May 22, 1928.
J. R. REYBURN
1,670,669
CONNECTING AND TIGHTENING DEVICE
Filed Sept. 11, 1926
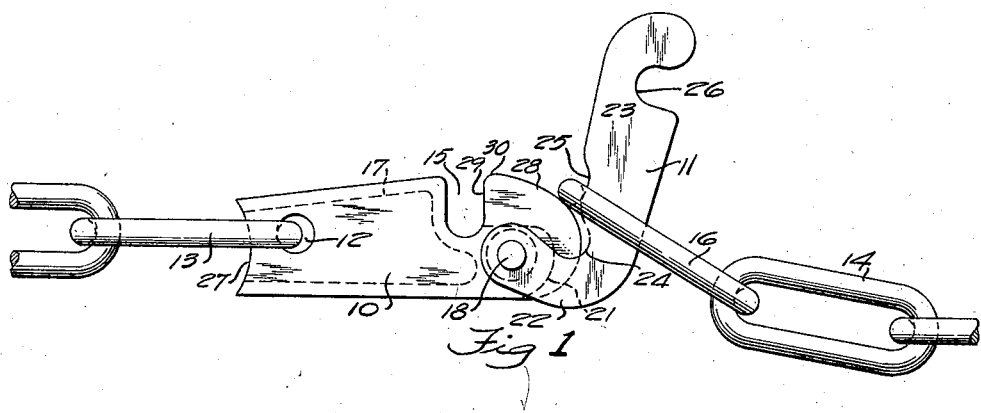
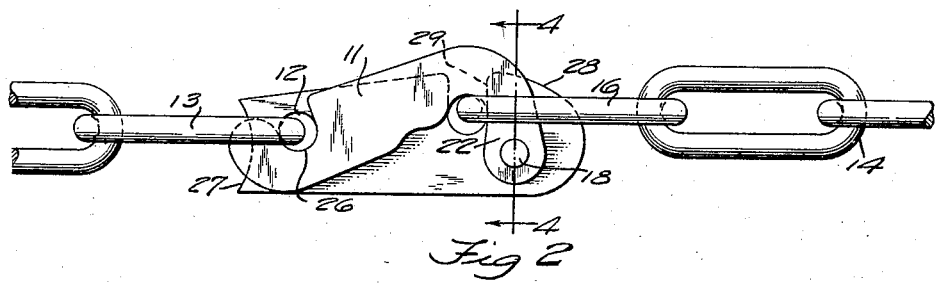
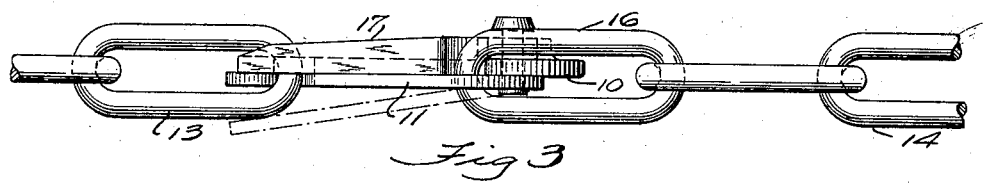
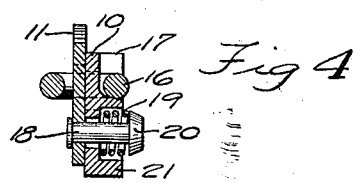
Inventor
John R. Reyburn
By Attorney Patented May 22, 1928.

1,670,669

UNITED STATES PATENT OFFICE.

JOHN R. REYBURN, OF FAIRFIELD, CONNECTICUT, ASSIGNOR TO AMERICAN CHAIN COMPANY INC., A CORPORATION OF NEW YORK.

CONNECTING AND TIGHTENING DEVICE.

Application filed September 11, 1926. Serial No. 134,764.

This invention relates to improvements in devices for connecting two sections or ends of chain, wire, or the like, and particularly to such devices in which means are provided for drawing the sections or ends towards each other with considerable tension.

A specific application of my invention is the connecting and tightening of the side chains of anti-skid devices for vehicle wheels.

An object of the invention is to provide a construction which permits of employing leverage to draw the chain ends together and in which an improved locking means is used for locking the chain ends in connected relation.

The present invention is a modification of my previous invention disclosed in United States Patent No. 1,404,319, issued January 24, 1922.

Referring to the drawings:

Figure 1 is a side view of my device in connection with two chain ends, showing the parts in unlocked position;

Figure 2 is a side view showing the parts in locked position;

Figure 3 is a top view of the device and associated chain ends, the device being in locked position; and, Figure 4 is a cross-sectional view on line 4—4 of Figure 2.

As shown in the drawings, my invention comprises a tension member 10 and an angle lever 11 pivoted thereto. The tension lever consists of a plate which has relatively permanent attachment to one of the chains that are to be connected. This attachment is accomplished by forming an aperture 12 in one end of the plate, through which an end link 13 of the chain is passed. For connection with the opposite chain end 14 I provide near the opposite or free end of the plate a transverse slot 15 to receive the opposite end of link 16. The bottom of the slot is preferably rounded and the side walls of the slot are disposed approximately at right angles to the longitudinal axis of the plate. One side of the plate is flat and the other is formed with a reinforcing flange 17.

The angle lever 11 is pivoted to the flat side of the plate by any suitable means, such as a rivet 18 passing through the plate and the lever. Resilient means are provided to hold the lever normally against the plate so that it will oscillate in a plane parallel to the flat face of the plate. These means preferably consist in making the rivet longer than the combined thickness of the plate and lever and fitting a compression spring 19 between the flanged face of plate and a head 20 on the adjacent end of the rivet. An annular portion 21 of the flange 17 surrounds and protects the spring 19. While the spring holds the lever 11 in frictional engagement with the plate 10, the spring also permits the levers 11 to be swung laterally away from the plate, as indicated by broken lines in Figure 3.

The angle lever 11 is formed of two arms 22 and 23, disposed approximately at right angles to each other. The inner arm 22, namely the one through which the rivet 18 passes, is considerably shorter than the outer arm 23. A rounded recess 24 is formed in the edge of the lever in the angle between these arms, and in the edge of the arm 23 adjacent to recess 24 is a rounded depression or shallow recess 25. In the opposite edge of the arm 23 near the outer end thereof is a slot 26. The location of the slot is such that when the lever is moved to the locked position, shown in Figure 2, the slot 26 will register with the aperture 12. The plate 10 is preferably bounded by a concave edge 27 at the attached end, while at the opposite end it is formed with a rounded nose 28 extending approximately to the outer margin of the recess 24 when the lever 11 is in the position shown in Figure 1. The curvature of the nose 28 is carried back to the point where it meets the adjacent side wall 29 of the slot 15, forming at this point a rounded corner 30. The wall 29 constitutes a shoulder adapted to take the pull of the link 16. When the parts are in locked position the outer end of the lever 11 overhangs the edge 27, providing a finger hold.

The operation of my device is as follows: The chain ends that are to be connected are drawn together sufficiently to permit of inserting the lever in the eye of the end link 16, and the lever 11 is moved to the position shown in Figure 1, in which position the end link 16 will be caught in the depression 25. The lever is then swung over to the position shown in Figure 2, and as the lever is moved to this position, the link 16 is carried toward the fixed end of the plate, sliding along the nose 28 until it slips over the corner 30 and into the slot 15. Continued movement of the lever 11 to locking position, forces the link 16 into the slot 15, and when the lever reaches the position shown in Figure 2, the recess 24 combines with the slot 15 to form a round aperture or eye in which the link 16 is confined. In moving the lever 11 to the position shown in Figure 2, the outer end thereof strikes the link 13 and the lever is then moved laterally, as indicated by broken lines in Figure 3, to clear the link 13. The outer end of the lever is then hooked through the link 13 with the link lying in the slot 26. In this position the device is locked, and even with the chain sections slack, there will be no tendency for the parts to become unlocked because of the positive engagement of the links 13 and 16 with the respective ends of the lever 11 and its frictional engagement with the plate 10. It will be observed that when tension is applied to the chain sections, the link 16 will bear against section 22 of the lever and tend to hold the lever in locked position. It will be impossible to unlock the device without first moving the lever downward and tilting the link upward so as to clear link 13 from the slot 26 after which the lever 11 must be moved laterally against the action of the spring 19.

While I have described a preferred embodiment of my invention, it will be understood that various changes and modifications can be resorted to without departing from the scope of my invention as defined in the following claims.

I claim:

1. A connecting and tightening device comprising a tension member formed with an aperture at one end to receive a chain link and with an open slot near the opposite end, and a locking lever formed with a hook at one end and pivotally connected at the other end to the slotted end of the tension member, said lever being movable to close over the mouth of said slot, and hook under said link, being free from lateral projections.

2. A connecting and tightening device comprising a tension member and a locking lever pivotally connected end to end, the tension member being formed with a shoulder adjacent the pivoted end and with an aperture at the opposite end for attachment to a chain link, said lever lying wholly in a plane parallel with that of said tension member and being formed with a recess intermediate its ends and a hook at its free end adapted to hook under said link when the lever is in locked position.

3. A connecting and tightening device comprising a tension member and a locking lever pivotally connected end to end, the tension member being formed with an open slot adjacent the pivoted end and with an eye at the opposite end for attachment to a chain link, said lever lying wholly in a plane parallel with that of said tension member and being formed with a recess co-operating with said slot to form a closed aperture when the lever is in locked position, said lever being also formed at the free end with a hook oppositely disposed with respect to the recess and adapted to hook into said link.

4. A connecting and tightening device comprising a tension member and a locking lever pivotally connected end to end, the tension member being formed with an open slot adjacent said pivotal connection, the lever being formed with a deep recess at a distance from said pivotal connection approximately equal to the distance of the slot therefrom, the lever being also formed with a shallow recess adjacent the deep recess on the side remote from said pivotal connection.

5. A connecting and tightening device comprising a tension member and a locking lever pivotally connected end to end, the tension member being formed with an open slot adjacent said pivotal connection, and with an aperture adjacent the opposite end thereof, the lever being formed with a deep recess at a distance from said pivotal connection approximately equal to the distance of the slot therefrom, the lever being also formed with a shallow recess adjacent the deep recess on the side remote from said pivotal connection and the lever being further formed with a hook oppositely disposed with respect to said recesses and at a distance from the pivotal connection approximately equal to the distance of the aperture therefrom.

6. A connecting and tightening device comprising a tension member and a locking lever pivotally connected end to end, the tension member being formed with an open slot adjacent said pivotal connection and with an aperture adjacent the opposite end thereof, the lever being formed with a deep recess at a distance from said pivotal connection approximately equal to the distance of the slot therefrom, the lever being also formed with a shallow recess adjacent the deep recess on the side remote from said pivotal connection and the lever being further formed with a hook oppositely disposed with respect to said recesses and at a distance from the pivotal connection approximately equal to the distance of the aperture therefrom, the free end of the lever projecting beyond the apertured end of the tension member.

7. A connecting and tightening device comprising a tension member formed with an aperture at one end to receive a chain link and with an open slot near the opposite end, a locking lever pivotally connected to the tension member and movable to close said slot, said locking lever being formed at its free end with an outwardly extending hook adapted to engage said link (and resilient means for normally retaining said lever in the same plane of oscillation relatively to said tension member.

8. A connecting and tightening device comprising a tension member and a locking lever pivotally connected to each other end to end, said tension member being provided with an aperture to receive a chain link, said lever being provided with a hook adapted to hook into said link, said pivotal connection being established by means of a rivet of greater length than the combined thickness of said lever and tension member, and a spring mounted on the rivet for normally maintaining said lever in the same plane of oscillation relative to said tension means, the tension member being formed with an annular flange surrounding said spring.

9. A connecting and tightening device comprising a tension member and a locking lever pivotally connected to each other end to end, said tension member being provided with an aperture to receive a chain link, said lever being provided with a hook adapted to hook into said link, said pivotal connection being established by means of a rivet of greater length than the combined thickness of said lever and tension member, and a spring mounted on the rivet for normally maintaining said lever in the same plane of oscillation relative to said tension means, the tension member being formed with an annular flange surrounding said spring, and with extensions of said flange serving as marginal reinforcements of said tension member.

In testimony whereof, I have signed this specification.

JOHN R. REYBURN.